United States Patent
Olsen

(10) Patent No.: US 8,657,454 B1
(45) Date of Patent: Feb. 25, 2014

(54) VACUUM FORMED REFLECTOR FOR SOLAR ENERGY

(75) Inventor: Randall B. Olsen, Carlsbad, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 13/338,432

(22) Filed: Dec. 28, 2011

(51) Int. Cl.
*G02B 7/182* (2006.01)

(52) U.S. Cl.
USPC .......................................................... 359/871

(58) Field of Classification Search
USPC ........... 359/871, 872; 126/605, 653, 661, 687
See application file for complete search history.

(56) References Cited

U.S. PATENT DOCUMENTS

| | | |
|---|---|---|
| 3,125,091 A | 3/1964 | Sleeper |
| 4,035,536 A | 7/1977 | Morrison |
| 4,051,834 A | 10/1977 | Fletcher |
| 4,069,811 A | 1/1978 | Tabor |
| 4,131,336 A | 12/1978 | Frosch |
| 4,136,671 A | 1/1979 | Whiteford |
| 4,151,830 A | 5/1979 | Crombie |
| 4,184,480 A | 1/1980 | Kenny |
| 4,184,482 A | 1/1980 | Cohen |
| 4,203,425 A | 5/1980 | Clark |
| 4,238,265 A | 12/1980 | Deminet |
| 4,239,344 A | 12/1980 | Wildenrotter |
| 4,249,514 A * | 2/1981 | Jones ........................... 126/605 |
| 4,271,822 A | 6/1981 | Radebold |
| 4,278,074 A | 7/1981 | Uroshevich |
| 4,328,790 A | 5/1982 | Kircus |
| 4,359,042 A | 11/1982 | Belentepe |
| 4,432,342 A | 2/1984 | Lucas |
| 4,440,149 A | 4/1984 | Hattan |
| 4,458,673 A | 7/1984 | Benjamin |
| 4,547,432 A | 10/1985 | Pitts |
| 4,670,338 A | 6/1987 | Clemino |
| 4,834,066 A | 5/1989 | Collins |
| 5,056,892 A | 10/1991 | Cobb |
| 5,208,704 A | 5/1993 | Zito |
| 5,365,920 A | 11/1994 | Lechner |
| 5,915,379 A | 6/1999 | McClean |
| 5,956,191 A | 9/1999 | Blackmon |
| 6,176,588 B1 | 1/2001 | Davis |
| 6,206,531 B1 | 3/2001 | Williams |
| 6,994,082 B2 | 2/2006 | Hochberg |
| 7,077,532 B1 | 7/2006 | Diver |
| 7,343,913 B2 | 3/2008 | Niedermeyer |
| RE40,227 E | 4/2008 | Cobb |
| 7,395,820 B2 | 7/2008 | Kuckelkorn |
| 7,709,730 B2 | 5/2010 | Johnson |
| 2003/0150444 A1 | 8/2003 | Cedenblad |
| 2006/0144393 A1 | 7/2006 | Le Lievre |

(Continued)

OTHER PUBLICATIONS

Xiao, G., "A Closed Parabolic Trough Solar Collector", INRIA-a CCSD electronic archive server based on P.A.O.L. (France), Oct. 2007.

(Continued)

*Primary Examiner* — Euncha Cherry
(74) *Attorney, Agent, or Firm* — Kyle Eppele; Stephen E. Baldwin; Peter A. Lipovsky

(57) ABSTRACT

A reflector particularly adaptable to the collection of solar energy for use in heating systems, thermal to electrical conversion systems and in photovoltaic conversions systems. The reflector can also be used for transmission, or reception or both of radio frequency radiation.

16 Claims, 16 Drawing Sheets

(56) References Cited

U.S. PATENT DOCUMENTS

| | | |
|---|---|---|
| 2007/0186921 A1 | 8/2007 | Swanepoel |
| 2008/0047546 A1 | 2/2008 | Cummings |
| 2008/0047547 A1 | 2/2008 | Jona |
| 2008/0135095 A1 | 6/2008 | Cummings |
| 2008/0168981 A1 | 7/2008 | Cummings |
| 2009/0114280 A1 | 5/2009 | Jensen |
| 2009/0260620 A1 | 10/2009 | Winger |
| 2010/0043777 A1 | 2/2010 | Tabor |
| 2010/0043778 A1 | 2/2010 | Penciu |
| 2010/0051021 A1 | 3/2010 | Kunz |
| 2010/0101562 A1 | 4/2010 | Pellegrino |
| 2010/0108057 A1 | 5/2010 | Cummings |
| 2010/0186733 A1 | 7/2010 | Hoefler |
| 2010/0206296 A1 | 8/2010 | Matalon |
| 2010/0212657 A1 | 8/2010 | Moller |
| 2010/0212719 A1 | 8/2010 | Stolum |
| 2010/0224232 A1 | 9/2010 | Cummings |
| 2010/0229850 A1 | 9/2010 | Sankrithi |
| 2011/0088751 A1 | 4/2011 | Rosa |

OTHER PUBLICATIONS

Shanfelt, D. and Winn, R., "A Paradigm Shift in Solar Collectors", Energy Conversion Engineering Conference, pp. 1720-1723, Aug. 1996.

Mills, David R.; Morrison, Graham; Pye, John; Le Lievre, Peter; Multi-tower Line Focus Fresnel Array Project; J. Sol. Energy Eng.—Feb. 2006—vol. 128, Issue 1, 118-120.

Leutz, Ralf; Suzuki, Akio; Akisawa, Atsushi; Kashiwagi, Takao; Shaped Nonimaging Fresnel Lenses; Journal of Optics A: Pure and Applied Optics 2 (2000) pp. 112-116.

* cited by examiner

VACUUM FORMED REFLECTOR FOR SOLAR ENERGY

FEDERALLY-SPONSORED RESEARCH AND DEVELOPMENT

This invention (Navy Case NC 101,086) is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152;
voice: (619) 553-5118; email: ssc_pac_t2@navy.mil.

CROSS-REFERENCE TO RELATED APPLICATIONS

This application is related to application Ser. No. 13/017,154, filed Jan. 31, 2011, entitled "LIGHTWEIGHT SOLAR COLLECTOR ASSEMBLY AND ARRAY" (NC 100,709), Ser. No. 13/028,414, filed Feb. 16, 2011, entitled "TRACKING SYSTEM FOR LIGHTWEIGHT SOLAR COLLECTOR ASSEMBLY AND ARRAY" (NC 100,711), and Ser. No. 13/110,026, filed May 18, 2011, entitled "DUAL CHAMBER SOLAR REFLECTOR SYSTEM" (NC 100,842), all of which are assigned to the same assignee as the present application and which are hereby incorporated by reference herein.

BACKGROUND OF THE INVENTION

This invention relates generally to reflectors of radiant energy (e.g. electromagnetic radiation) both for collecting and emitting, and more specifically to concentrated solar power. The reflector of the invention is particularly adaptable to the collection of solar energy for use in heating systems, thermal to electrical conversion systems and in photovoltaic conversions systems. The reflector is also particularly well suited to relatively low cost, labor saving methods for erecting and maintaining such solar energy systems.

Over the years a variety of systems have been devised for the collection and utilization of solar energy. While many of these systems are quite efficient in accomplishing the objective, i.e. collecting and storing solar energy to supplement or replace more expensive systems utilizing common sources of energy, one primary problem remains, the initial cost of making and installing an efficient solar energy collecting system. If a solar energy collecting system is very expensive to make and install, such high capital expenditure is undesirable, since the potential user must wait too long to amortize this cost before realizing any savings in energy expense.

It is well known that solar energy may be converted into other useful forms of energy by using proper techniques. For example, solar energy may be converted into electrical energy by a so-called solar cell. The most common solar cells are made of silicon, but cells made of other materials, e.g., cadmium sulfide and gallium arsenide, have also been developed and tested. The required voltage and/or amperage may be generated using an appropriate series-parallel matrix in an integrated array.

At the current state of the art, a principal obstacle to wide scale adoption of solar cell energy collector installations is that manufacturing and installation costs of solar cell arrays generally are substantially higher than the cost of conventional electrical energy generating installations. Another factor limiting wide spread adoption of solar panel cells is radiant heating of the cells which reduces cell efficiency.

While the cost of manufacturing the solar cells per se currently is the single largest cost factor in the manufacture of a solar cell energy collector installation, any technique which increases the overall efficiency of a solar cell energy collector, or which reduces the cost of manufacturing and/or installing a solar cell energy collection system may have significant commercial importance.

In addition to the photoelectric conversion technique just described, it is well known that solar energy may be converted to other more useful forms of energy through thermal conversion techniques. Typically thermal conversion techniques involve using sunlight to heat up a liquid or gas contained in a thermal converter enclosure and then utilizing the heated liquid or gas in an appropriate manner well known to one skilled in the art to generate power.

Furthermore solar energy may be converted simply to thermal energy and the thermal energy subsequently used for other non-electric production processes (e.g. materials processing) and uses (e.g. water or space heating).

However, as in the case of solar cells, relatively high cost of manufacturing and relatively high installation costs have presented a principal obstacle to wide scale adoption of solar thermal energy collectors. Thus, any technique which reduces the cost of manufacturing and/or installing a solar thermal energy collector system may have significant commercial importance.

One technique the art has developed to increase efficiency of solar cells and thermal converters is to collect and focus solar energy onto the solar cells or thermal converters by means of a "solar concentrator". Thus a typical solar energy collection system may include reflective or refractive devices which are designed to collect solar energy impinging upon a relatively large area and to focus the collected energy onto a relatively small area of utilization. While the use of solar concentrators result in economic savings by increasing the effective collection area of a solar cell or thermal converter, the prior art solar concentrators themselves are costly to manufacture, and also may add appreciably to the weight of the solar energy collector system. This latter consideration is particularly important in the case of solar cell or solar thermal energy collector systems which are to be used on buildings since the heavier a solar energy collector system is, the more costly the required supporting structure.

SUMMARY OF THE INVENTION

Accordingly, a primary object of this invention is to provide a solar energy concentrator which substantially overcomes or avoids a number of the aforesaid problems encountered in the manufacture and use of solar energy collector systems according to prior art. Another object is to provide a method of making solar energy concentrators which are especially light weight, and which can be manufactured using relatively inexpensive, commercially available materials. Yet other objects of the invention are (1) to provide solar energy concentrators which may be effectively and easily employed for the collection and utilization of solar energy, and (2) to provide relatively low cost, labor saving methods for erecting and maintaining solar energy collectors of the type described.

An object of the present invention is to provide a method of making a solar reflector which is very economical because of the utilization of inexpensive materials.

Another object is to provide such a method wherein the steps for fabricating the few parts making up the assembly are simple and can be carried out inexpensively.

A further object of the invention is to provide such a method which involves very few steps to complete the assembly of the unit thereby reducing labor costs.

Another object of the invention is to provide such a method wherein the steps thereof can be carried out without utilization of expensive machinery, indeed one that can be accomplished with inexpensive standard tools.

Other objects, advantages and salient features of the present invention will become apparent from the following detailed description, which, taken in conjunction with the accompanying drawings discloses a preferred embodiment thereof.

BRIEF DESCRIPTION OF THE DRAWINGS

The invention will be more fully described in connection with the accompanying drawings, where like reference numerals designate like components, in which:

FIG. 1b is a top view of reflector 201 of FIG. 1a;

FIG. 8 shows an end, cross-sectional view of a portion of a drive/tracking system which can be utilized with the embodiments shown in FIGS. 6 and 7.

FIG. 10b shows a side view of the system of FIG. 10a.

DETAILED DESCRIPTION OF THE PREFERRED EMBODIMENTS

Figure 1B:
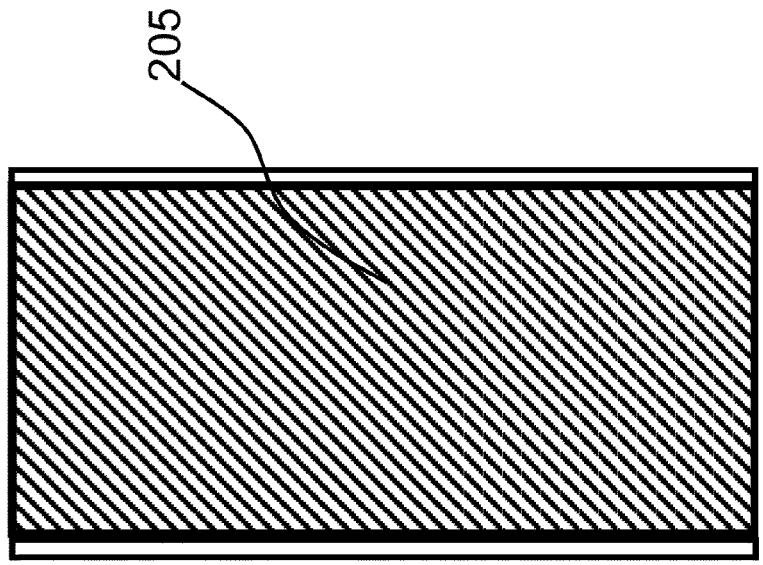
Figure 1A:
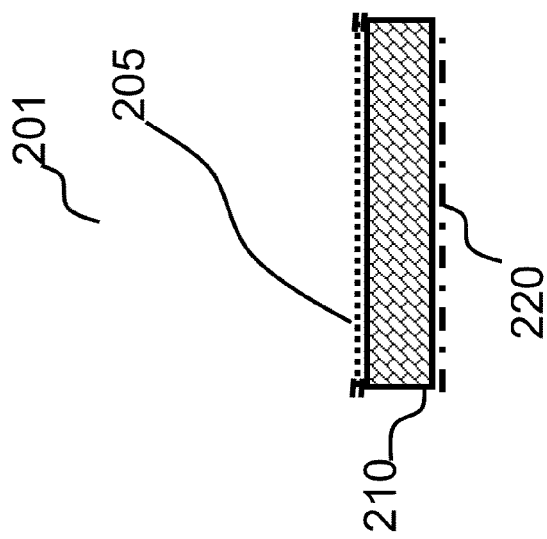
FIG. 1a is an end view of an embodiment of the instant invention showing a reflector 201.

FIG. 1a is an end view of an embodiment of the instant invention showing a reflector 201. FIG. 1b is a top view of reflector 201 of FIG. 1a. The length of the collector can be relatively short as illustrated or very much longer depending on particular application needs. Typical size scales for length can be on the order of 10 meters for roof-top applications to hundreds of meters for utility-scale applications. Typical widths can be less than a meter for roof-top applications to well above a meter for utility-scale applications.

Reflector 201 comprises a reflecting film 205 with a nearly flat parabolic shape. The parabolic shape is a specific example of an approximately constant cross-section shape. The parabolic shape is also a specific example of a surface with substantial curvature in only one dimension. Reflecting film 205 is held in place and in shape by a vacuum formed support structure 210 which is an example of a vacuum formed support means for the reflecting film 205. By itself, reflecting film 205 would not be able to maintain its shape against the force of gravity as it is very thin (which will be detailed below) and hence very flexible.

A preferred example substrate for reflecting film 205 is a polymer (e.g. polyethylene terephthalate (PET)) film with a thickness in the approximate range of 100 to 250 μm. For example, it has been found experimentally that films as thin as 100 μm may be approximately optimal (with regard to initial cost versus lifetime trade-offs) and that even films yet thinner can be used. Such thin polymer films are very flexible individually yet locally stiff enough to provide a surface flatness with acceptably specular performance for use in a solar concentrator.

For added lifetime in outdoor environments it is also preferred that reflecting film 205, and vacuum formed support structure 210 comprise a thin topcoat. An example of a preferred topcoat comprises acrylic polymer containing ultraviolet (UV) light blockers, stabilizers, or brighteners or the like as are well know in the art of sunlight stabilization of polymers. To provide light reflecting characteristics to reflecting film 205, preferably a metallized (e.g. aluminum) layer should be included, or alternatively multiple dielectric layers can be used.

Also shown is an optional back protective layer 220. The back protective layer 220 can be used to protect the vacuum formed support structure 210 from hail, wind-driven sand, and other environmental abuses during challenging weather. To invoke such protection, reflector 201 should be substantially inverted as is common in the art of arrayed solar tracking systems be they photovoltaic or solar thermal or both.

Figure 2:
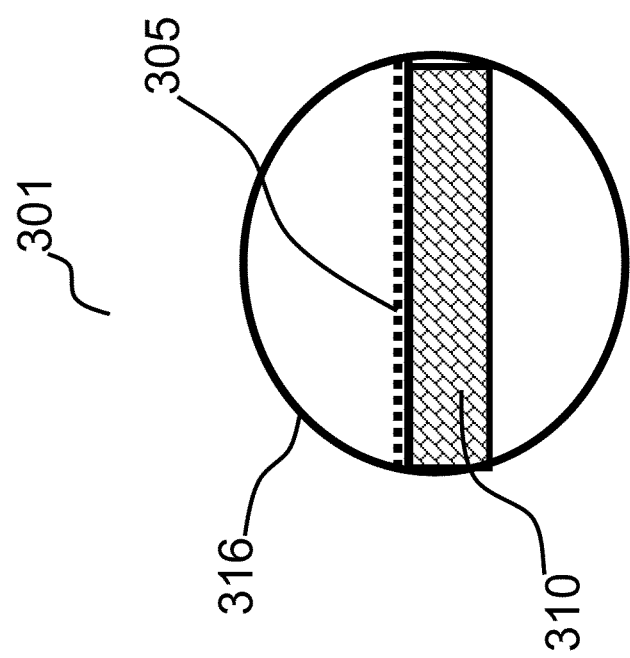
FIG. 2 is an end view similar to FIG. 1a, and shows a reflector 301 including a reflective film 305.

FIG. 2 is an end view similar to FIG. 1a, but shows a reflector 301 comprising a reflective film 305 held in place and in shape by a vacuum formed support structure 310 which is an example of a vacuum formed support means. The vacuum formed support structure 310 is in turn supported by rim 316

Figure 3A:
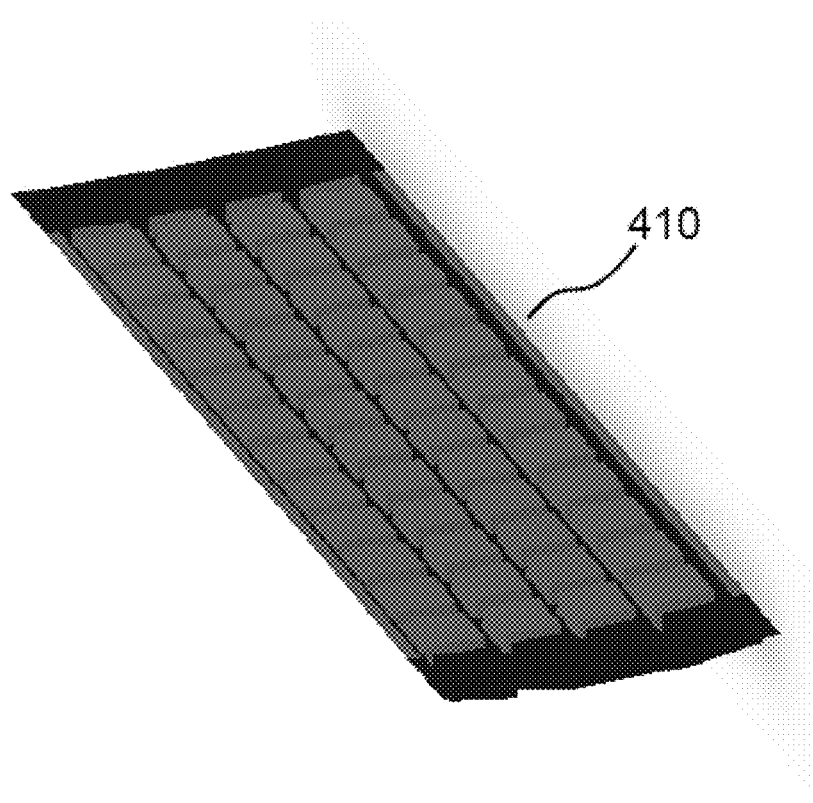
FIG. 3a is a sunny side up isometric view of a vacuum formed support structure 410.
Figure 3B:
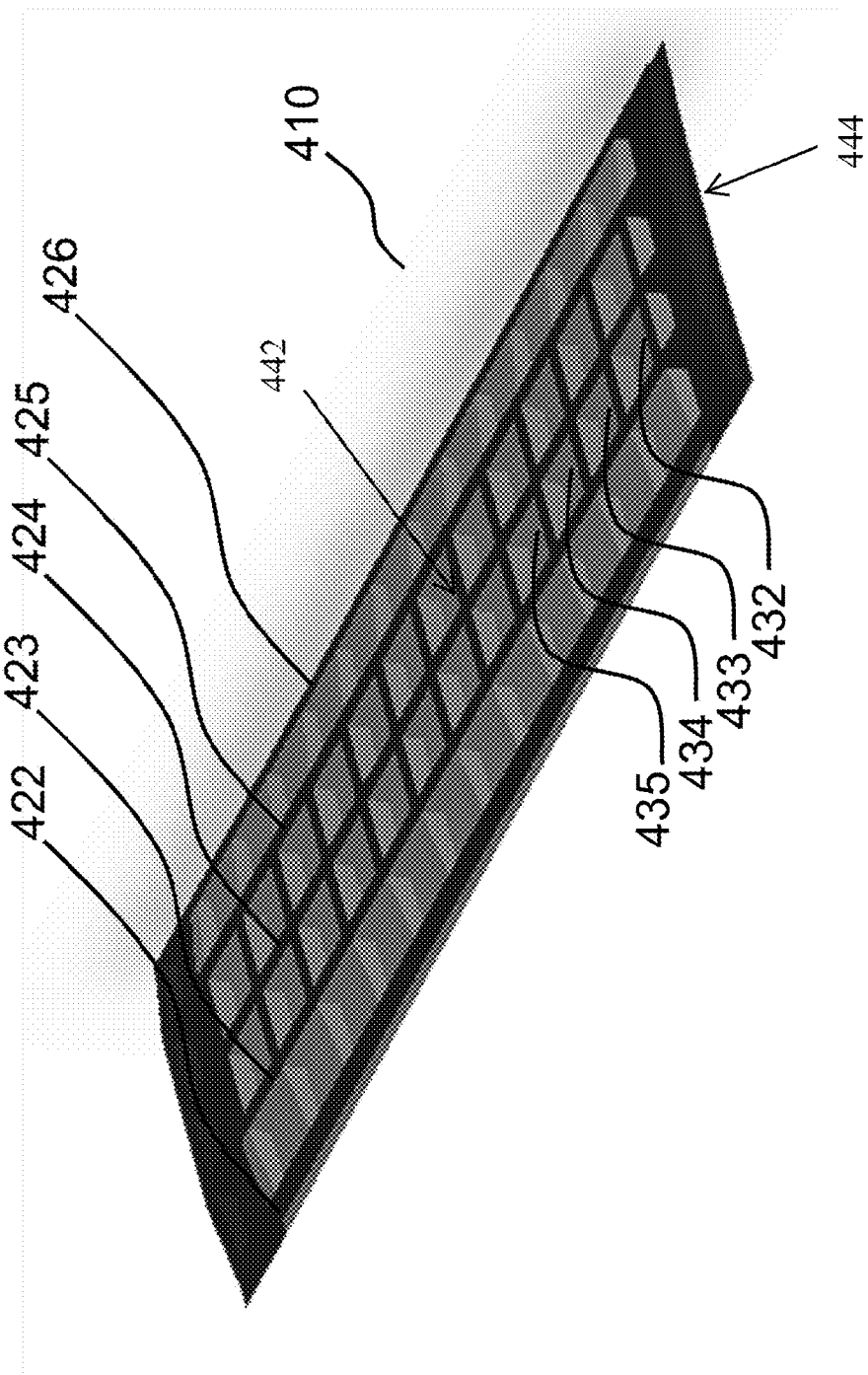
FIG. 3b is a sunny side down isometric view of the vacuum formed support structure 410.

FIG. 3a is a sunny side up isometric view of a vacuum formed support structure 410. FIG. 3b is a sunny side down isometric view of the vacuum formed support structure 410. In both views, a reflecting film is not attached to better illustrate the underlying structure. Support structure 410 comprises longitudinal support ribs 422, 423, 424, 425, and 426, as shown in FIG. 3b. Support structure 410 also comprises transverse support ribs 432, 433, 434, 435, and so on. The support ribs 422-426 and 432-435 form an inner grid support portion 442. An end portion 444 is also shown. Support structure 410 can be produced by conventional and well known vacuum forming means using conventional sheet materials preferably polymers (e.g. high impact polystyrene (HIPS) or thermoformable polyethylene terephthalate (aPET or gPET)).

A preferred size for the support structure 410 is roughly 0.5 meters wide by approximately 1 to 3 meters long, by approximately 4 centimeters tall, though much larger and much smaller sizes may be selected depending on the particulars of a given application. The grid support portion 442 is preferably a rectangular grid in shape, as shown in FIG. 3b. However, other grid support shapes could be utilized as well, such as hexagonal or other polygon shapes.

The thickness of the sheet can very depending on the details of the application, but will generally be in the range of 0.1 mm to 2 mm (approximately 4 to 80 thousandths of an inch) The corresponding rib structures shown in FIG. 3b are approximately 10 centimeters square for a specific example of hardware that has been experimentally demonstrated by the inventor.

Figure 3C:
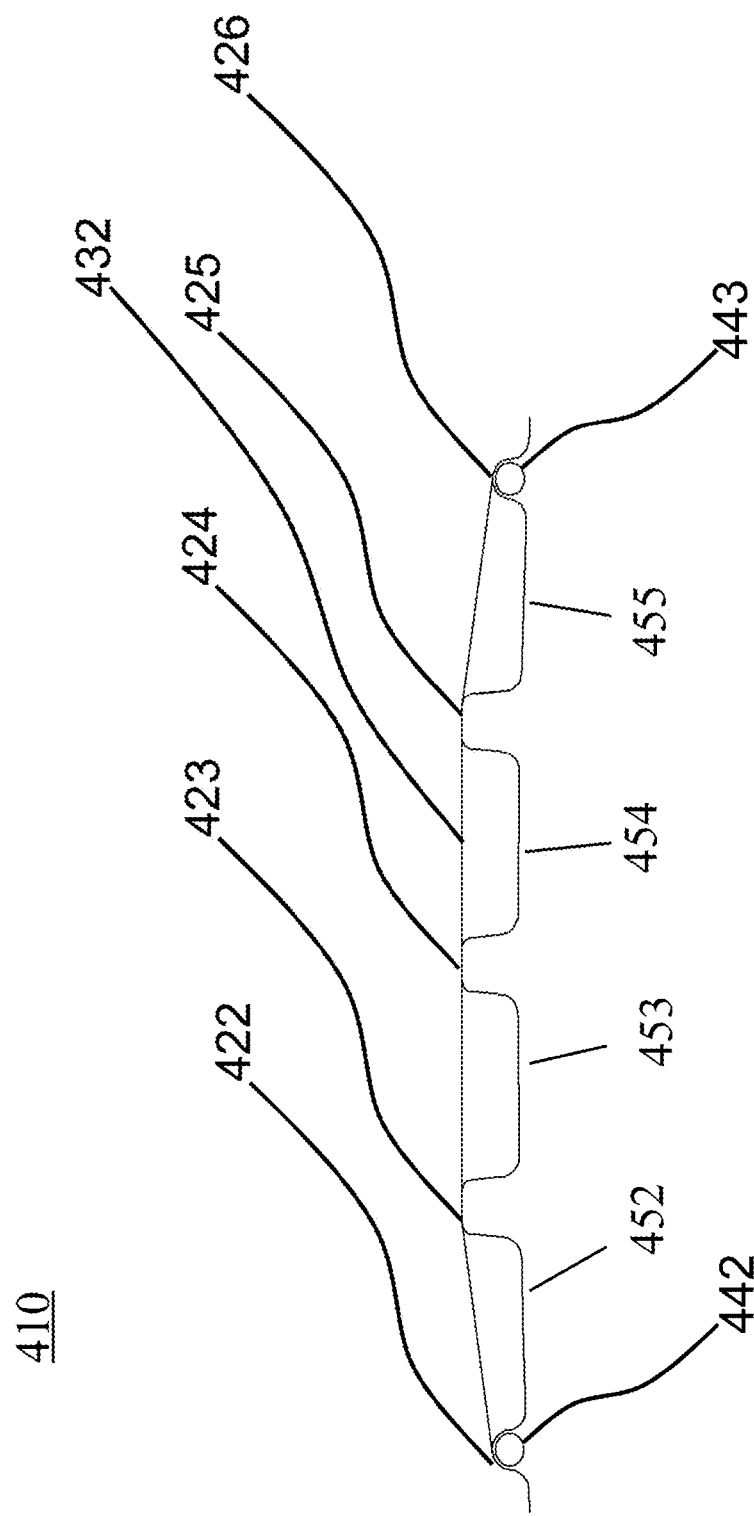
FIG. 3c is a cross-sectional end view of structure 410.

FIG. 3c is a cross sectional view of the vacuum formed support structure 410. A mirror layer and a support layer are not shown in this view. Longitudinal support ribs 422, 423, 424, 425, and 426 are shown as is the transverse support rib 432. Vacuum formed plateaus (or pads) 452, 453, 454 and 455 in FIG. 4c are the result of the vacuum forming process described above. Also shown in FIG. 3c are support tubes 442 and 443. Note that support structure 410 can be shaped to wrap around the support tubes 442 and 443 to better distribute and support weight and wind loads.

Figure 3D:
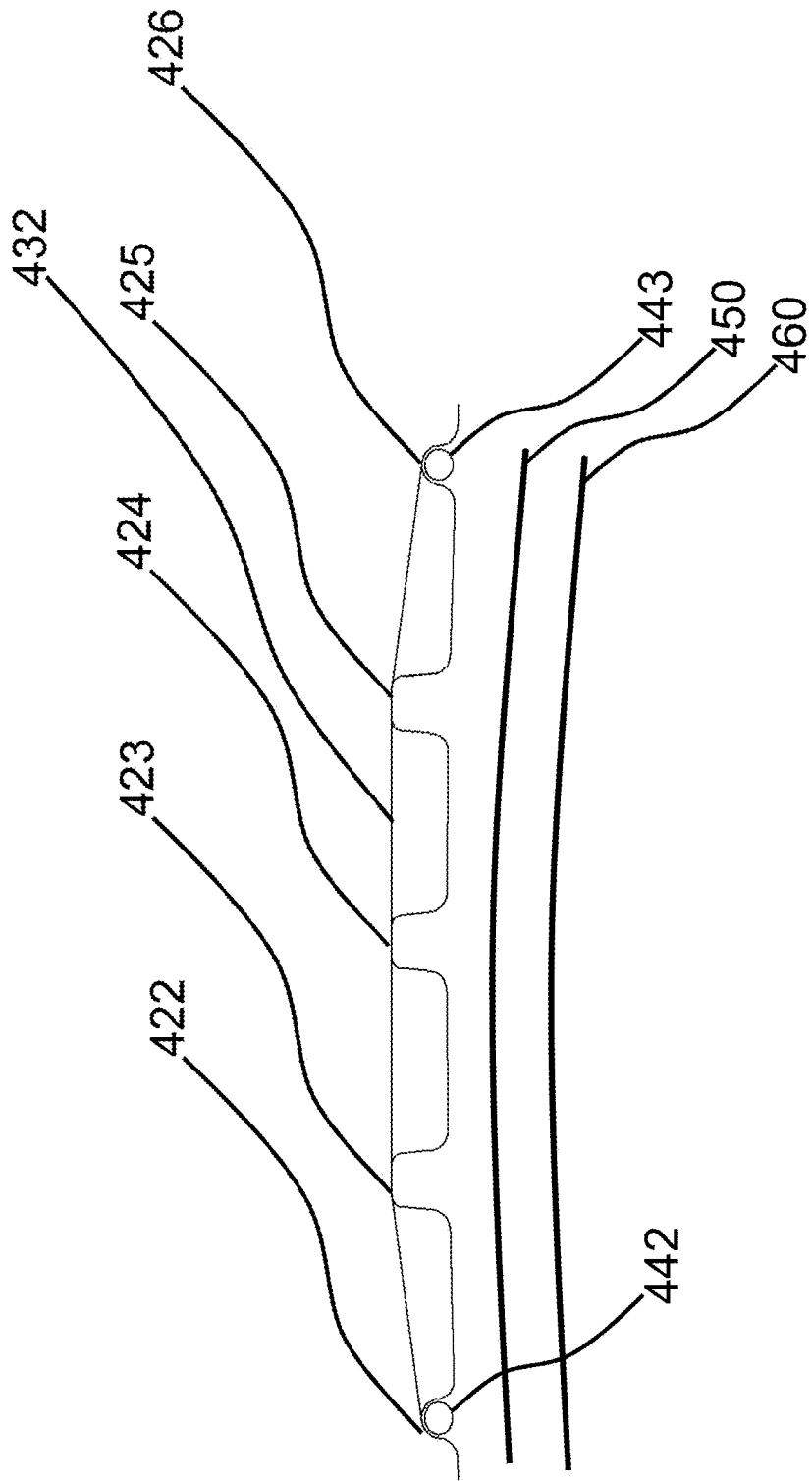
FIG. 3d is another cross-sectional end view of structure 410.

FIG. 3d is another cross sectional view (partially exploded) of the vacuum formed support structure 410. In FIG. 3d, the parts which are shown exploded are support layer 450, and mirror layer 460. The support layer 450 when bonded (by any variety of adhesives, epoxies or melting) to the support structure 410 forms a stiff structure which is highly mass efficient and hence low cost. Mirror layer 460 is preferably aluminum metalized PET protected on its sunny side by an acrylic or urethane hard coat and attached via its opposite side to support layer 450 by a pressure sensitive adhesive. Mirror layer 460 can also take on a variety of other forms including, for example, a conventional second surface silver coated glass mirror.

Figure 4:
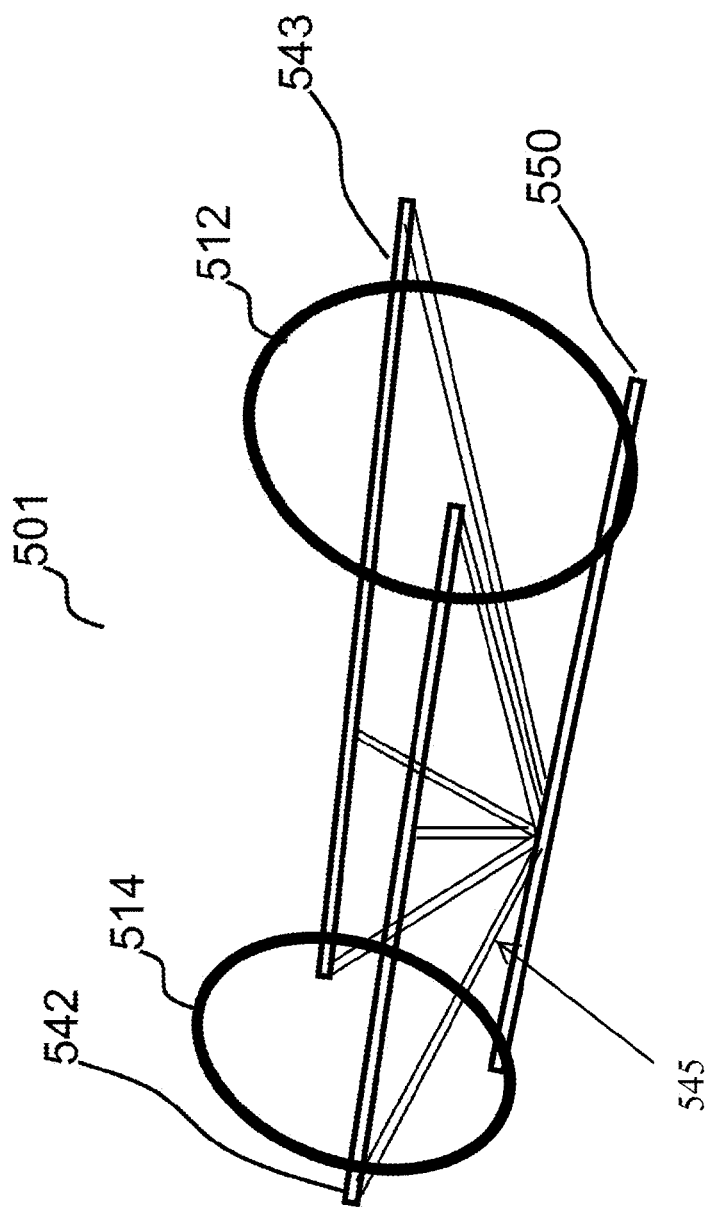
FIG. 4 is an isometric view of a section of support system 501 with rims 512 and 514, support tubes 542 and 543 and exoskeletal tube 550.

FIG. 4 is an isometric view of a section of support system 501 with rims 512 and 514, support tubes 542 and 543, diagonal support tubes 545 and exoskeletal tube 550. Not shown (for clarity) in this view is a vacuum formed support structure which would sit upon and be affixed to the support tubes 542 and 543. The incorporation of the exoskeletal tube 550 gives substantial stiffness to the section of support system 501.

Figure 5:
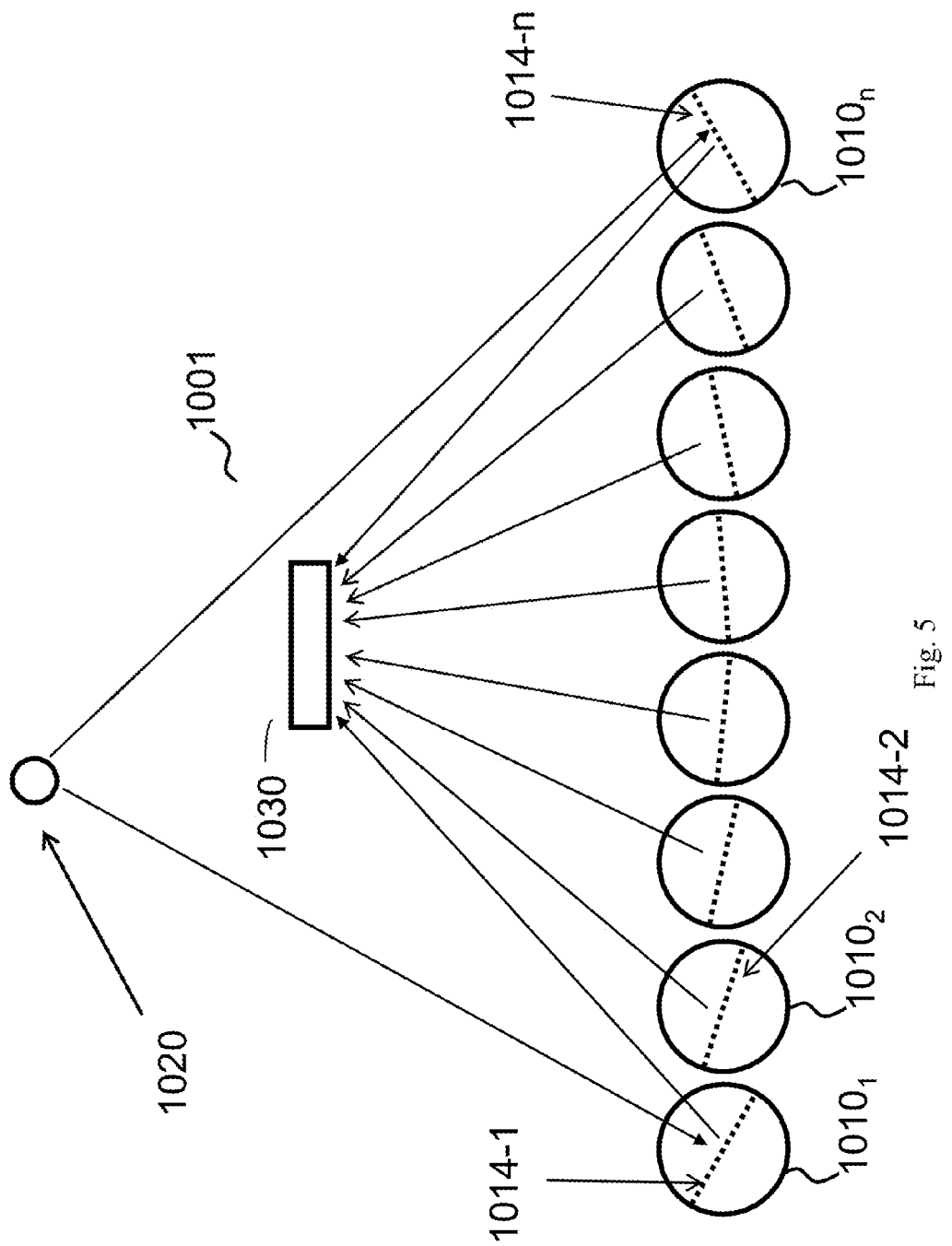
FIG. 5 shows a diagrammatic representation of a reflector system 1001 that comprises a set of ground mounted reflectors $1010_1$, $1010_2$, through $1010_1$, that are arrayed in parallel.

FIG. 5 shows a diagrammatic representation of a reflector system 1001 that comprises a set of ground mounted reflectors $1010_1$, $1010_2$, through $1010_1$, that are arrayed in parallel, which supports mirrors 1014-1, 1014-2, etc.

The reflectors $1010_1$, $1010_2$, through $1010_n$, are driven collectively or individually, to track movement of the sun (relative to the earth) and they are orientated to reflect incident solar radiation from the sun 1020 to a receiver 1030. The receiver 1030 would desirably be disposed within the focal plane or focal axis of all of the reflectors 1010.

As examples, the solar radiation from sun 1020 is reflected by reflecting film $1014_1$ to receiver 1030, by reflecting film $1014_2$, through reflecting film $1014_n$ to receiver 1030. It should be appreciated that all of the reflectors 1010 shown in FIG. 9 can uniformly reflect incident solar radiation from the sun 1020 via respective reflecting film 1014 to the receiver 1030, which is longitudinally disposed above the reflectors 1010 in the appropriate focal axis or focal plane.

An example of a suitable tracking system which could be utilized with the reflector system 1001 of FIG. 5 is described in the above cross-referenced patent application entitled "Tracking System for Lightweight Solar Collector Assembly and Array" (NC 100,711).

The array of reflectors shown in FIG. 5 could be placed a horizontal array, as shown, such as placed on a planar ground location, or placed on an angled roof of a structure, such as at locations of northern or southern latitudes greater than 45 degrees (for example), or even located in a vertical array (for example, attached to the side of a building or other structure).

Figure 6:
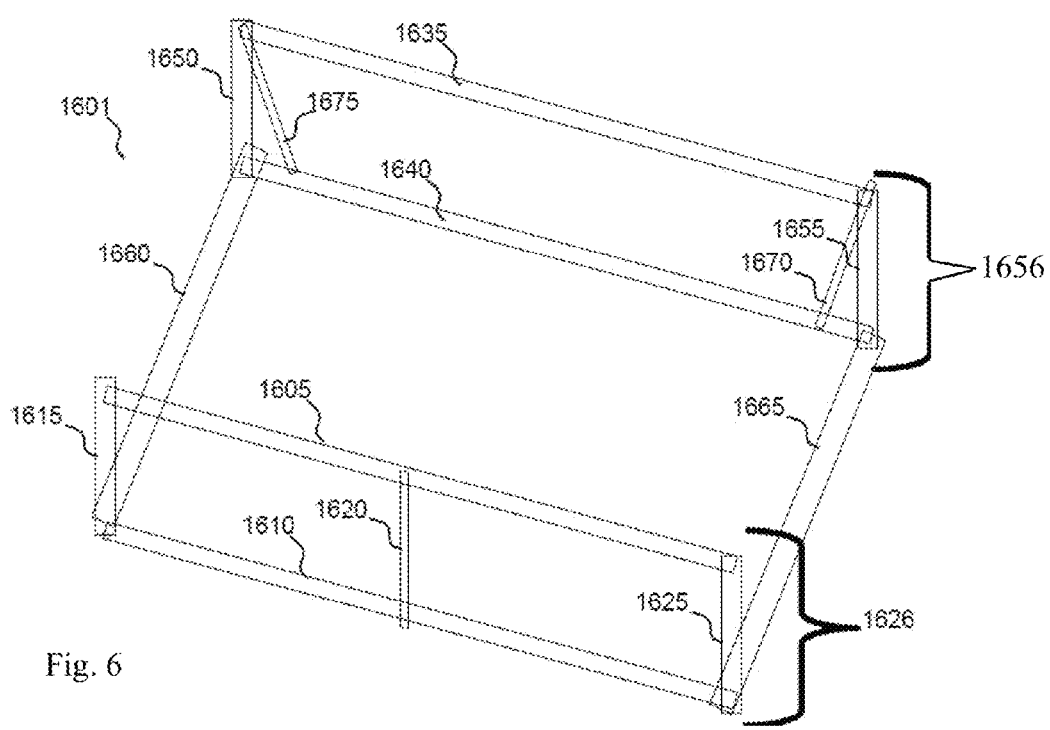
FIG. 6 shows a support frame 1601.

FIG. 6 shows a support frame 1601. Frame 1601, is preferable built up from rigid elongated members 1605, 1610, 1615, 1620, 1625, 1630, 1635, 1640, 1645, 1650, 1655, 1660, and 1665. Rigid elongated members 1605, 1610, 1615, 1620, 1625 form a first end frame 1626 which supports a solar tracking drive system illustrated and later detailed in FIG. 7. Furthermore, first end frame 1626 provides mechanical support against gravity, wind and other environmental loads for optical reflecting units on a first end. Similarly, rigid elongated members 1635, 1640, 1645, 1650, and 1655 form a second end frame 1656, which supports the optical reflecting units on their opposite end. Rigid elongated members 1660, and 1665 serve to maintain proper spacing between (and vertical support for) first end frame 1626 and second end frame 1656. Additional structural integrity and rigidity can be provided by rigid elongated members 1670 and 1675. Elongated members can take many forms though tubular (e.g. cylindrical) will be suitable in many cases. Another form for elongated member that will generally suitable is extruded angle (e.g. "angle iron").

Elongated members have been successfully built and tested which in one example are made of plastic (e.g. ABS plastic, or more specifically water drainage pipe nominal 2" diameter). In such a construction example, joints between elongated members are provided by water drainage pipe joints and assemblies are fastened together with cement as is common in the plumbing art. Elongated members have also been successfully built and tested which are made of metal (e.g. steel, or more specifically EMT electrical conduit nominal ½" diameter).

Figure 7:
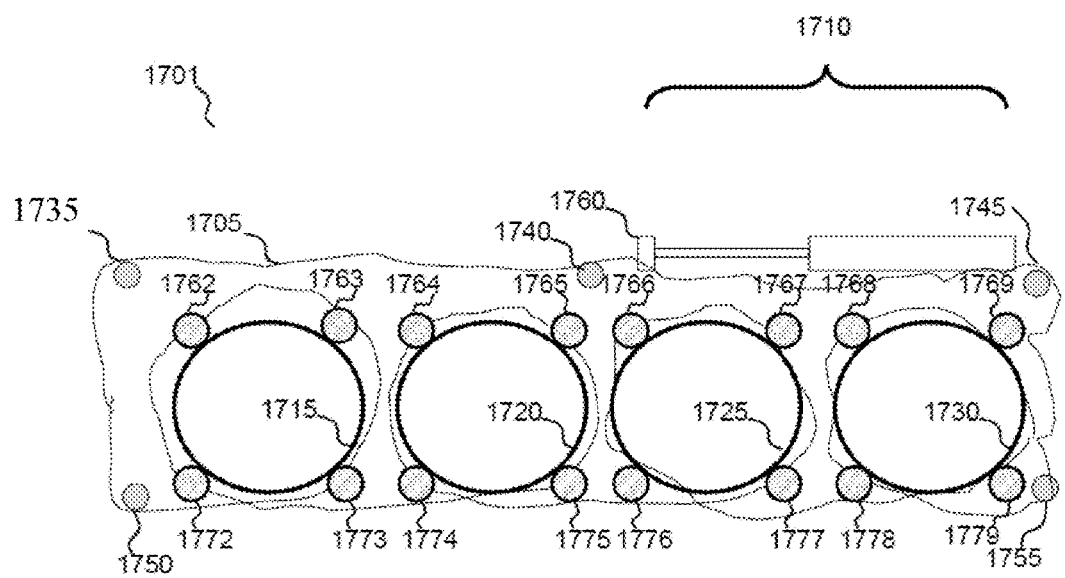
FIG. 7 shows a tracking/drive system 1701.

FIG. 7 shows a tracking/drive system 1701. Tracking/drive system 1701 uses cable loop 1705 to couple the driving force of linear actuator 1710 to rotate one or more rims exemplified by rims 1715, 1720, 1725 and 1730. Cable loop 1705 can couple to rims in wide variety of circuit configurations, but FIG. 7 shows a preferred circuit. It can be seen that the cable wraps around each of the rims 1715, 1720, 1725 and 1730 in turn. This full loop of wrapping around each rim (as opposed to simply wrapping around a small fraction of the circumference of each rim) ensures a tight and self-cinching grip which results in a high level of friction and thereby minimizes, if not completely eliminates, slip between the driving cable and the rotating rims.

To properly manage the motion of the cable, the cable loop 1705 is wrapped around of a set of pulleys 1735, 1740, 1745, 1750, and 1755 which are affixed to a frame (not shown in this figure). The rims 1715, 1720, 1725 and 1730 are preferably located at the ends of the reflectors (not shown in this figure) and more preferable a north end (assuming that the reflectors are oriented along a north-south axis and the system is in the northern hemisphere on the Earth), though they may also be located midway along such collector tubes (or any other location along the collector tubes for that matter).

There are two main reasons for preferring an end location for the rims 1715, 1720, 1725 and 1730. The first reason is that an end location gives easy access for maintenance of all of the parts of the tracking/drive system. The second reason is that locating the rims at the north end minimizes shadows cast by the rims (assuming that the collector's tubes are oriented along a north-south axis and the system is in the northern hemisphere on the Earth). In some situations, a central location for the rims along the collector tubes may be preferred. This preference would correspond to systems which have very long reflectors and would be chosen to optimize the transfer of torque along the very long reflectors.

Cable loop 1705 is attached to a movement arm 1760 of linear actuator 1710, for example by a nut and bolt (not illustrated). Linear actuator 1710 is also affixed to a frame (not shown in this figure) and can be any linear actuator as is commonly available in the solar tracking industry. Linear actuator 1710 is preferably affixed to an upper portion or top of a frame to ease maintenance and to avoid being submerged when heavy rains might flood where the tracking/drive system 1701 is located. A turnbuckle (not shown) could be utilized to provide tightening of the cable loop 1705 by suitable adjustment.

To assure that the forces applied to the rims result in essentially pure rotation (i.e. with no significant translation), the rims 1715, 1720, 1725 and 1730 are supported and translationally constrained by casters 1762, 1763, 1764, 1765, 1766, 1767, 1768, 1769, 1772, 1773, 1774, 1775, 1776, 1777, 1778 and 1779. The rims are preferably shaped like typical bicycle rims and can actually be bicycle rims. The casters preferably have wheels that are narrow enough to fit within the circumferential trough of the rims (i.e. the circumferential region around bicycle rims where bicycle tires are normally gripped by the rims).

Figure 8:
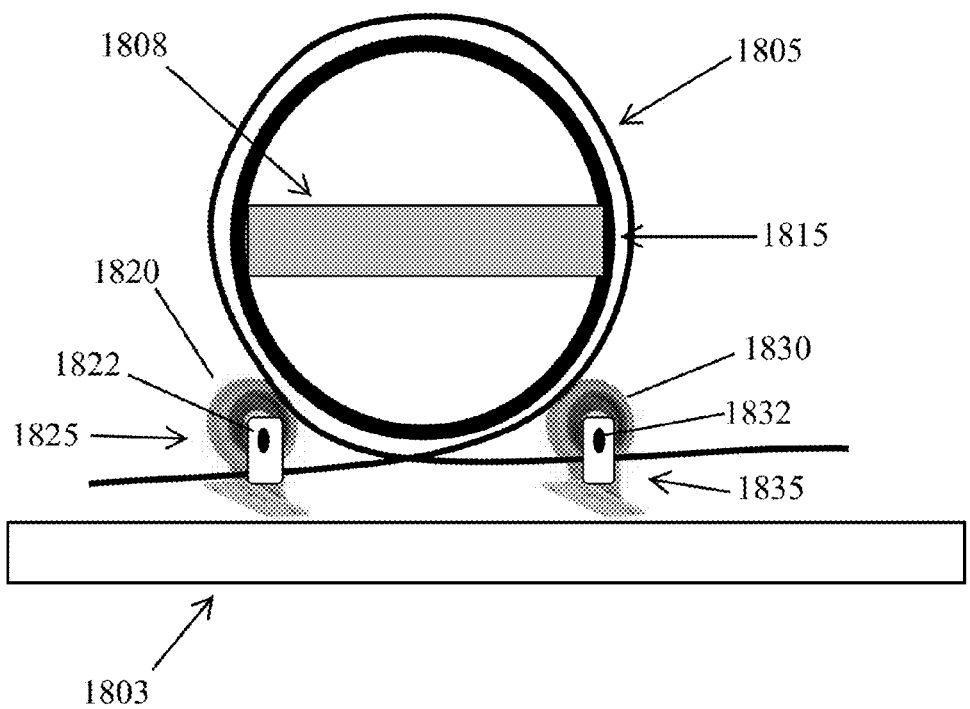
FIG. 8 shows details of a tracking/drive system and more particularly.

FIG. 8 shows details of a tracking/drive system and more particularly, FIG. 8 shows an end, cross-sectional view of a portion of a drive/tracking system which can be utilized with the embodiments shown in FIGS. 6 and 7.

In FIG. 8, a rim 1815 is supported on rollers 1820 and 1830. The rim 1815 is in contact with the reflector 1808. The rollers 1820 and 1830 are parts of a first set of casters 1825 and 1835 respectively and supported by axels 1822 and 1832 respectively. Note that cable loop 1805 wraps around the rim 1815 and under both axels 1822 and 1832. This preferred routing of the cable loop 1805 ensures that rim 1815 will remain located (held down) during a high wind gust.

The first set of casters 1825, 1835 are affixed to the top portion of elongated support member 1803. A second set of casters (not shown in FIG. 8) could be affixed at the top of rim 1815 with another elongated support member (not shown) to provide still further support. It should be understood that the cable loop 1805 is completely wrapped around the rim 1815 to provide a gripping action, which enables controlled rotation of the rim 1815 (and the cylindrical housing 1808), thereby minimizing or eliminating translational movement.

Figures 9A, 9B:
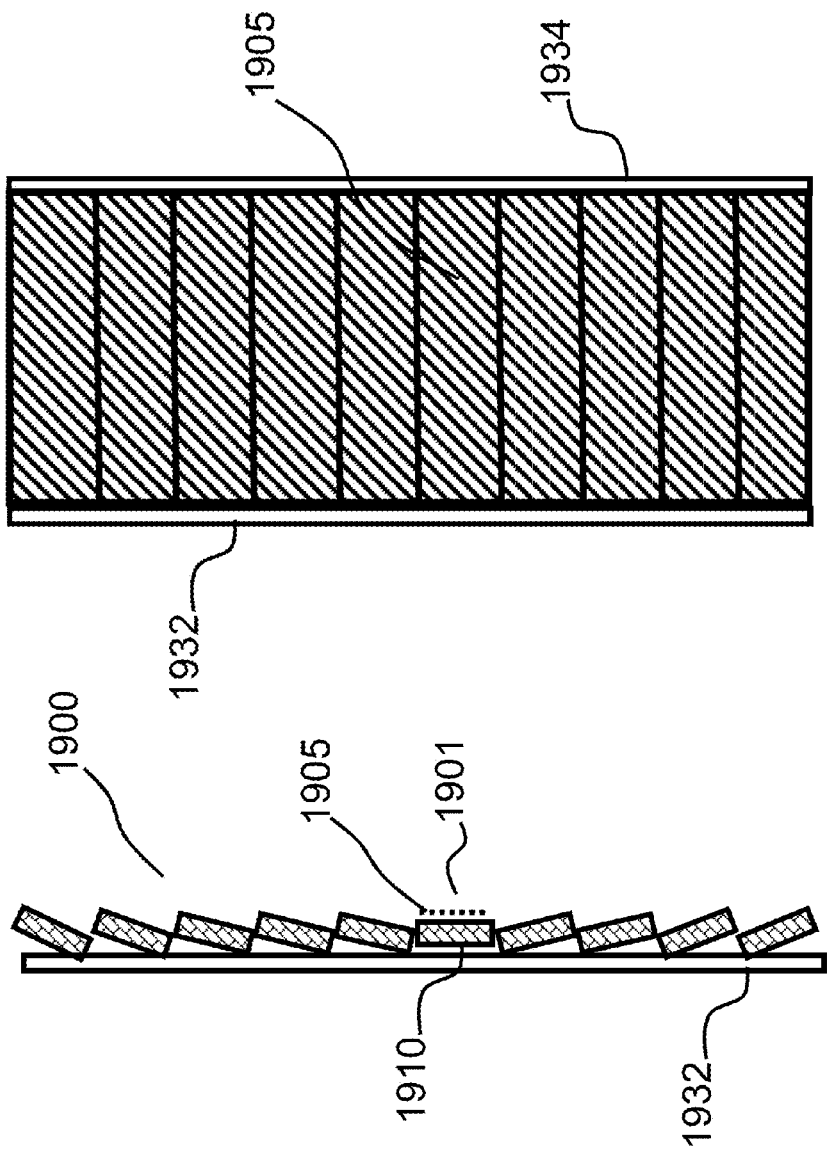
FIG. 9a shows a side view of a portion of a 2-dimensional concentrating reflecting system 1900 in the form of a Fresnel array of reflectors exemplified by reflector 1901.
FIG. 9b shows a top view of a portion of the 2-dimensional concentrating reflecting system 1900.

FIG. 9a shows a side view of a portion of a two-dimensional concentrating reflecting system 1900 in the form of a Fresnel array of reflectors exemplified by reflector 1901. FIG. 9b shows a top view of a portion of the two-dimensional concentrating reflecting system 1900. Reflector 1901 comprises a reflecting film 1905 with a parabolic shape that is nearly flat (i.e., a long focal length) in direction of "into the paper" in FIG. 9a. In the preferred embodiment, the reflecting film 1905 is preferably approximately flat in the other direction (i.e. "in the plane of the paper" in FIG. 9b). Alternatively, the reflecting film 1905 can be curved with an approximately parabolic shape, or other light concentrating shape if a different intensity profile is desired near the focus. Reflecting film 1905 is held in place and in shape by a vacuum formed support structure 1910 which is an example of a vacuum formed support means for the reflecting film 1905. The vacuum formed support structure 1910 is held by support tubes 1932 and 1934.

The reason that the preferred embodiment desires an approximately flat shape for reflecting film 1905 (and for its companion reflecting films in the two-dimensional concentrating reflecting system 1900) is that in this way a region of concentrated light can be created that has a constant intensity profile in one dimension. This characteristic is critical for the reflector of the present invention to be optimally useful in photovoltaic systems that use linearly serially connected cells.

It is well known in the photovoltaic art that uniformity of lighting is important for optimal performance (e.g., highest efficiency and to minimize hot spots which would reduce reliability and lifetime) of linearly serially connected cells. In fact, it is also well known that such linearly serially connected cells can even be seriously damaged or destroyed if the non-uniformity of illumination becomes too large (unless the cells are sufficiently protected by by-pass diodes).

Figure 10A:
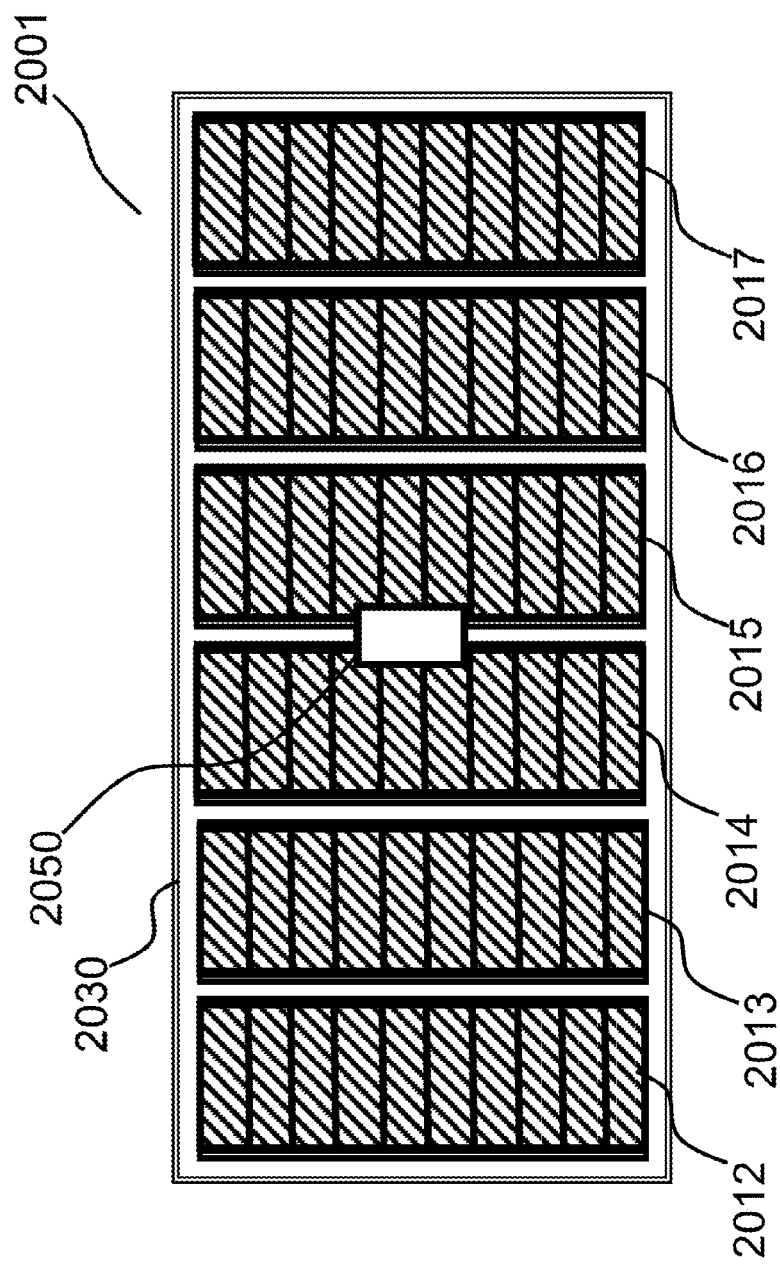
FIG. 10a shows a top view of a 2-dimensional concentrating reflecting system 2001 where Fresnel arrays of reflectors 2012, 2013, 2014, 2015, and 2016 are in turn arrayed and supported in frame 2030.

FIG. 10a shows a top view of a two-dimensional Fresnel concentrating reflecting system 2001 where Fresnel arrays of reflectors 2012, 2013, 2014, 2015, 2016 and 2017 are in turn Fresnel arrayed relative to each other and supported in frame 2030. Note that system 2001 has a Fresnel architecture in both directions. The Fresnel arrays of reflectors 2012, 2013, 2014, 2015, 2016 and 2017 are used to reflect and concentrate sunlight to receiver 2050. Reflector 2012 corresponds to the portion shown in FIGS. 9a and 9b. Receiver 2050 is shown centered within the array of reflectors 2012-2017 in system 2001, and disposed above the system. A suitable focal line for receiver 2050 could have dimensions of approximately 2 inches (5 cm) by 8 inches (20 cm), as an example.

Figure 10B:
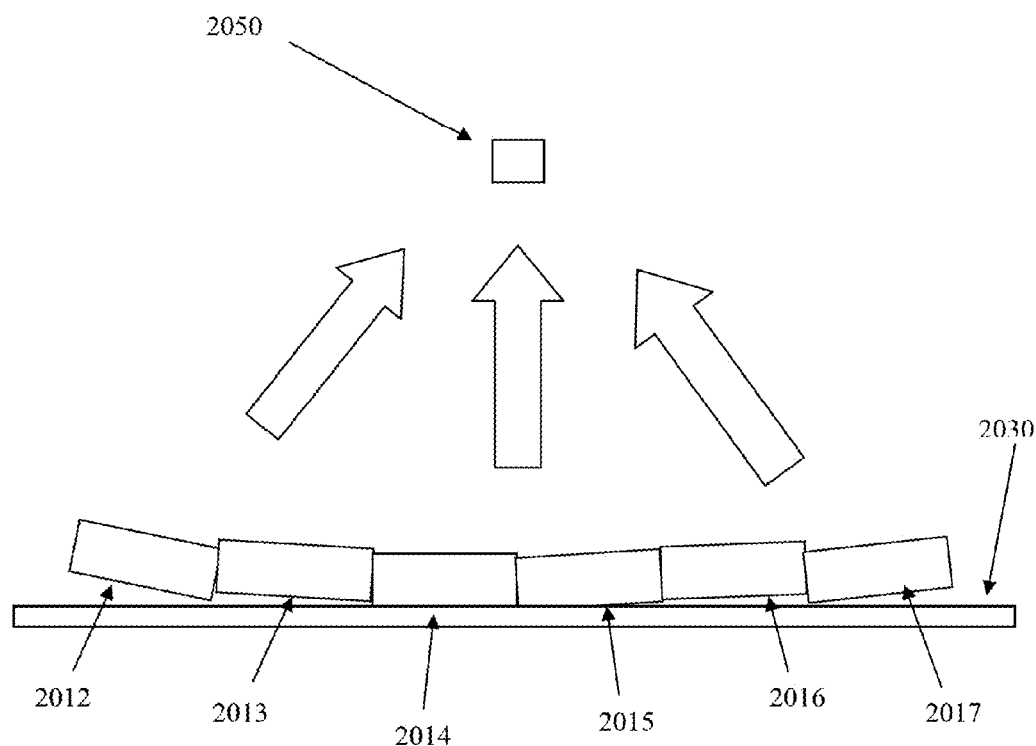

FIG. 10b shows an end view of the system of FIG. 10a. In FIG. 10b, the reflectors 2012-2017 can be seen in a Fresnel array relative to each other (a second Fresnel direction), and supported by frame 2030. The illustrative concentrated reflection patterns are shown toward receiver 2050.

Figure 10C:
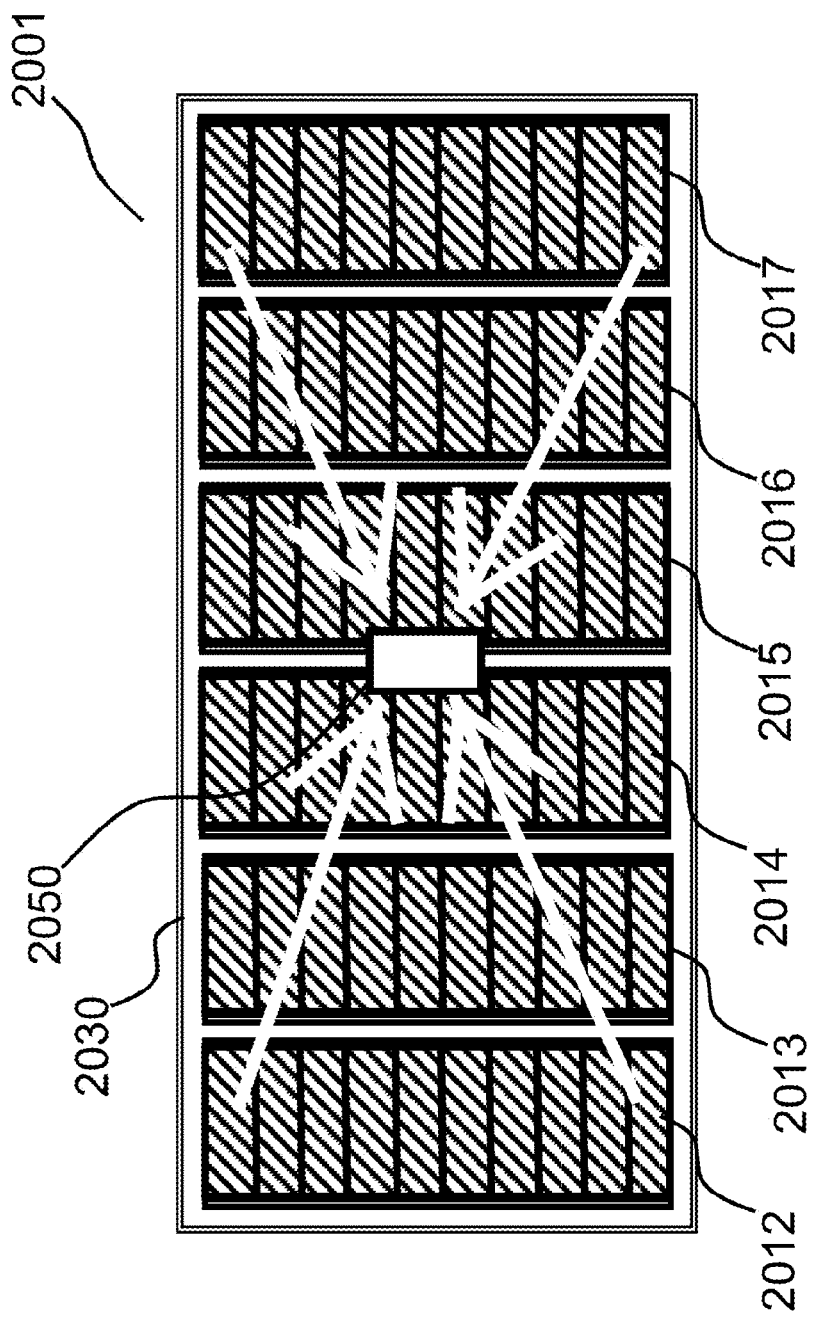
FIG. 10c shows a top view of FIG. 10a with illustrative concentrated reflection patterns.

FIG. 10c shows a top view of FIG. 10a with illustrative concentrated reflection patterns to the receiver 2050.

Figure 11:
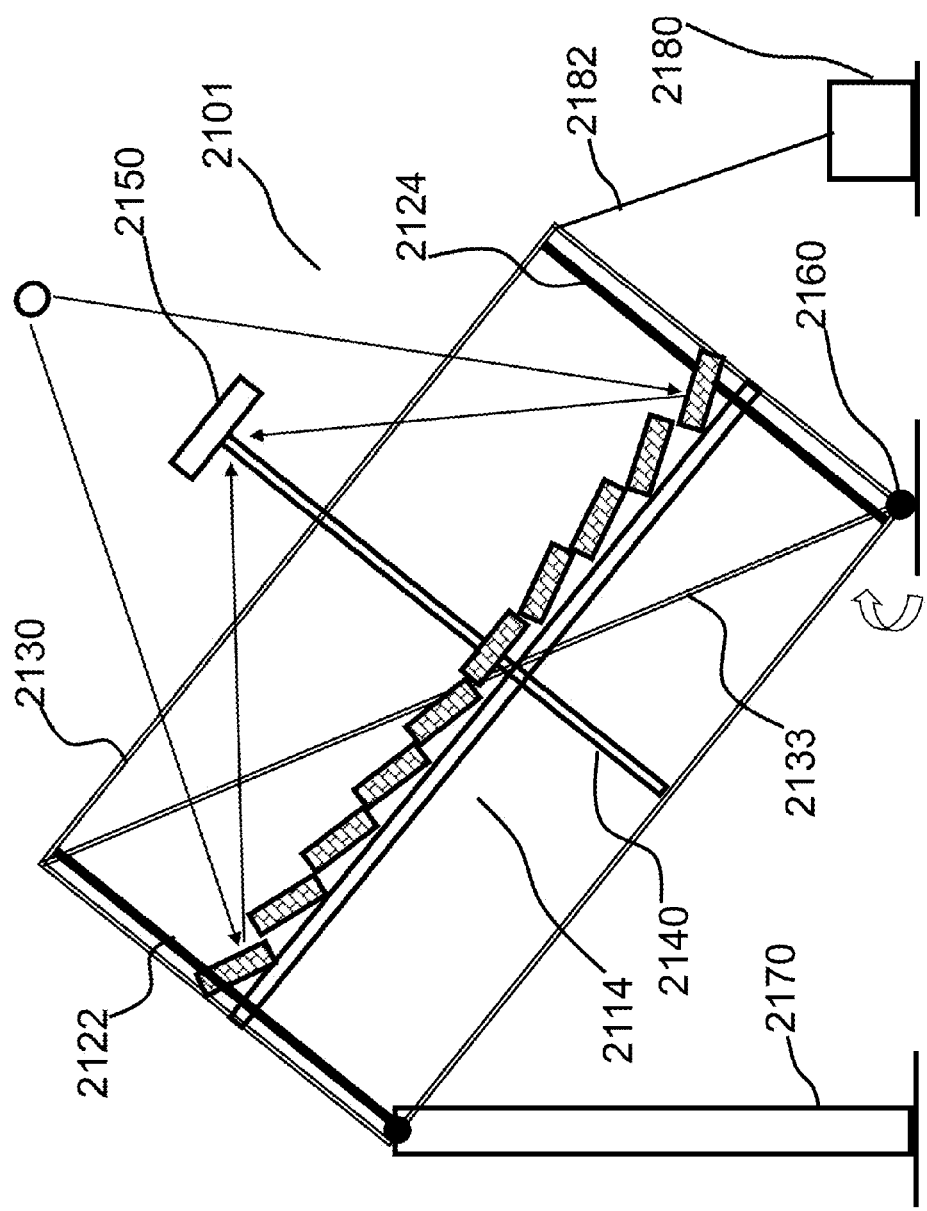
FIG. 11 shows a sectional side view of a 2-dimensional concentrating reflecting system 2101 and illustrates a preferred configuration for tracking the sun.

FIG. 11 shows a sectional side view of a two-dimensional concentrating reflecting system 2101 and illustrates a preferred configuration for tracking the sun. Fresnel array of reflectors 2114 are support by rims 2122 and 2124 which are in turn supported by frame 2130. The frame 2130 can be constructed of lightweight tubular aluminum or low cost galvanized steel and is preferably well triangulated as exemplified by triangulation tubing 2133 to ensure structural stiffness. The frame 2130 also supports a receiver 2150 via receiver support structure 2140. Solar tracking in the second dimension is preferably performed by rotating the frame 2130 about pivot 2160 (where the axis is "into the paper"). Preferably this motion is driven by a compression actuator 2170, for example by a motorized scissor jack mechanism or by a linear actuator. Alternatively, the motion can be driven by tension actuator 2180 via tension element 2182 (where 2182 could be a cable and 2180 could be a motorized spool holding the cable).

In one preferred embodiment, a reflecting system is disclosed with at least one reflector. Each reflector includes a reflecting film and a vacuum formed support means attached to the reflecting film. Each reflector is contained within a cylindrical confining volume where the cylindrical confining volume has a confining volume length and a confining volume radius such that the confining volume length being at least two times larger than the confining volume radius and the reflecting film having an approximately constant cross-sectional shape when attached to the support means and the surface shape having a radius of curvature larger than the confining volume radius. Further details are described in the above cross-referenced application entitled "LIGHT-WEIGHT SOLAR COLLECTOR ASSEMBLY AND ARRAY", the details of which have been incorporated by reference.

A preferred embodiment could also be such that the vacuum formed support means includes longitudinal support ribs and transverse support ribs transversely arranged with the longitudinal support ribs to form a rectangular grid support pattern. A polymer sheet material which is vacuum formed about the rectangular grid support pattern of the longitudinal and transverse support ribs to form a rectangular grid of vacuum formed plateaus.

Other embodiments of the present invention for solar collectors could be used for when a single collector housing is utilized, or for when two tracking systems are desired for both ends of, for example, a solar collector array which has an extended horizontal length. Other embodiments of the present invention for tracking can apply to solar collectors of a broad range of configurations.

While the invention has been described in terms of a collector of solar energy for both thermal and photovoltaic (and combination) energy systems, it is important to explicitly state that this lightweight aperture can be used for other systems as well. One such system is radio frequency technology where the aperture can be used for transmission, or reception or both. The radio frequency band of primary interest extends from a few tens of MHz up to several hundred GHZ. This range can even extend through the THz bands for either short range (e.g. radar) applications within the earth's atmosphere or to long range application in outer space.

The aperture of the invention need not be restricted to electromagnetic radiation. With suitable wall materials (to assure good reflectivity) the aperture can be used for acoustic applications. Examples would include sensitive listening systems in the air and a multitude of underwater sound-based devices.

Once given the above disclosure, therefore, various other modifications, features or improvements will become apparent to the skilled artisan. Such other features, modifications, and improvements are thus considered a part of this invention, the scope of which is to be determined by the following claims.

The invention claimed is:

1. A reflecting system with at least one reflector, each reflector comprising:
   a reflecting film;
   a vacuum formed support means attached to the reflecting film;
   each reflector being contained within a cylindrical confining volume;
   the cylindrical confining volume having a confining volume length and a confining volume radius;
   the confining volume length being at least two times larger than the confining volume radius; and
   the reflecting film having an approximately constant cross-sectional shape when attached to the support means and the surface shape having a radius of curvature larger than the confining volume radius.

2. The reflecting system of claim 1 wherein the vacuum formed support means comprises:
   support ribs arranged with one another to form a polygon grid support pattern; and
   a polymer sheet material which is vacuum formed about the polygon grid support pattern of the support ribs to form a polygon grid of vacuum formed plateaus.

3. The reflecting system of claim 2 wherein the polygon grid pattern is a hexagonal grid pattern.

4. The reflecting system of claim 2 wherein the polygon grid pattern is a rectangular grid pattern.

5. The reflecting system of claim 4 wherein the rectangular grid pattern comprises:
   longitudinal support ribs; and
   transverse support ribs transversely arranged with the longitudinal support ribs to form a rectangular grid support pattern resulting in a rectangular grid of vacuum formed plateaus.

6. The reflecting system of claim 5 comprising:
   an additional support layer bonded to the support means to form a stiffer vacuum formed support means.

7. The reflecting system of claim 6 comprising:
   a mirror layer bonded to the additional support layer, the mirror layer having a mirror side and an opposite side, the opposite side bonded to the additional support layer.

8. The reflecting system of claim 7 including at least one support tube which forms an endoskeletal structural element.

9. The reflecting system of claim 7 including at least one support tube which forms an exoskeletal structural element.

10. The reflecting system of claim 8 wherein said each reflector additionally comprises at least one rotational drive means.

11. A reflecting system with at least one reflector, each reflector comprising:
    a reflecting film;
    a vacuum formed support structure attached to the reflecting film, the support structure having a rectangular grid of vacuum formed plateaus;
    each reflector being contained within a cylindrical confining volume, the cylindrical confining volume having a confining volume length and a confining volume radius, the confining volume length being at least two times larger than the confining volume radius; and
    the reflecting film having a surface shape when attached to the support structure, the surface shape having a radius of curvature larger than the confining volume radius.

12. The reflecting system of claim 11 wherein the vacuum formed support structure comprises:
    longitudinal support ribs;
    transverse support ribs transversely arranged with the longitudinal support ribs to form a rectangular grid support pattern;
    a polymer sheet material which is vacuum formed about the rectangular grid support pattern of the longitudinal and transverse support ribs to form the rectangular grid of vacuum formed plateaus.

13. A reflecting system with at least one reflector, each reflector comprising:
    a reflecting layer attached to a substrate;
    a vacuum formed support means attached to said substrate;
    a tracking means connected to said vacuum formed support means wherein the tracking means orients said each reflector to concentrate reflected electromagnetic energy to a receiver; and
    each reflector being contained within a cylindrical confining volume, the cylindrical confining volume having a confining volume length and a confining volume radius, the confining volume length being at least two times larger than the confining volume radius.

14. The reflecting system as in claim 13 wherein the electromagnetic energy is light energy.

15. The reflecting system as in claim 14 wherein the electromagnetic energy is solar energy.

16. The reflecting system of claim 15 comprising:
    a receiver and wherein the tracking means orients each reflector to direct solar energy toward the receiver.

* * * * *